July 21, 1959 R. N. RHODES ET AL 2,896,018

AUTOMATIC FREQUENCY CONTROL APPARATUS

Filed Dec. 19, 1956 3 Sheets-Sheet 1

INVENTORS.
Roland N. Rhodes &
Charles B. Oakley
BY
ATTORNEY.

July 21, 1959 R. N. RHODES ET AL 2,896,018

AUTOMATIC FREQUENCY CONTROL APPARATUS

Filed Dec. 19, 1956 3 Sheets-Sheet 2

INVENTORS.
Roland N. Rhodes &
Charles B. Oakley
BY [signature]
ATTORNEY.

July 21, 1959 R. N. RHODES ET AL 2,896,018

AUTOMATIC FREQUENCY CONTROL APPARATUS

Filed Dec. 19, 1956 3 Sheets-Sheet 3

INVENTORS.
Roland N. Rhodes &
Charles B. Oakley
BY [signature]
ATTORNEY.

United States Patent Office 2,896,018

Patented July 21, 1959

2,896,018

AUTOMATIC FREQUENCY CONTROL APPARATUS

Roland N. Rhodes, Levittown, Pa., and Charles B. Oakley, Hamilton Square, N.J., assignors to Radio Corporation of America, a corporation of Delaware Application December 19, 1956, Serial No. 629,383

7 Claims. (Cl. 178—5.8)

This invention relates to automatic frequency control (AFC) apparatus, and more particularly to apparatus for maintaining substantially constant the tuning of the local oscillator in a superheterodyne television receiver of the intercarrier sound type.

Intercarrier sound television receivers make use of the fact that, in accordance with present day television standards, the amplitude-modulated video information and the frequency-modulated sound information are transmitted on separate carrier waves whose center frequencies are separated by a fixed amount, presently 4.5 megacycles (mc.). In a superheterodyne intercarrier sound receiver the video and sound carriers are heterodyned with the output signal of a local oscillator to produce corresponding intermediate frequency (IF) waves which are similarly separated by 4.5 mc. The two IF waves are then heterodyned with each other in the second or video detector of the receiver to produce a beat frequency of 4.5 mc. which carries the sound information as FM modulation. After amplification in one or more sound IF stages, the 4.5 mc. signal is demodulated in an FM detector, such as a ratio detector.

While present day television receivers are relatively stable with respect to oscillator frequency drift, some form of automatic frequency control of the local oscillator is desirable, particularly when ultra-high frequency or color television signals are being received. One type of AFC system for use with an intercarrier sound television receiver may utilize the voltage appearing across the stabilizing capacitor of a ratio detector in the sound channel as a control voltage for a frequency control circuit of the local oscillator. As will be more fully explained hereinafter, the voltage across the stabilizing capacitor of the ratio detector is a sensitive measure of the tuning of the local oscillator. However, as the signal selecting circuits of the television receiver are moved from channel to channel the voltage across the stabilizing capacitor of the ratio detector may drop to zero. In this case, it is possible that when a signal is being received that the oscillator will lock to a frequency other than the desired frequency, and no picture or sound will be reproduced. This condition is called "lock-out."

An object of this invention is to provide an improved means for automatically controlling the local oscillator frequency in an intercarrier sound television receiver.

It is another object of this invention to provide an automatic frequency control system for the local oscillator of an intercarrier sound television receiver utilizing the stabilizing voltage of a ratio detector in the sound channel of the receiver in a relatively simple and inexpensive circuit arrangement which is relatively unaffected by extraneous signals and which will not "lock-out" to an undesired frequency.

In accordance with the invention, frequency control means are provided for the local oscillator of an intercarrier sound television receiver in which the control signal for the frequency control means is derived from a point in the sound detector circuit at which the voltage is solely responsive to changes in the signal strength applied to the detector. Provision is made to apply a reference voltage to the frequency control means during switching of the receiver from channel to channel to insure that the oscillator does not lock-in to an undesired signal. There is also provided means to reduce the sensitivity of the oscillator to the control voltage applied to the frequency control means at the higher frequency channels to alleviate "lock-out" problems at these frequencies.

However, the invention may be better understood when the following description is read in connection with the accompanying drawings, in which.

Figure 1:
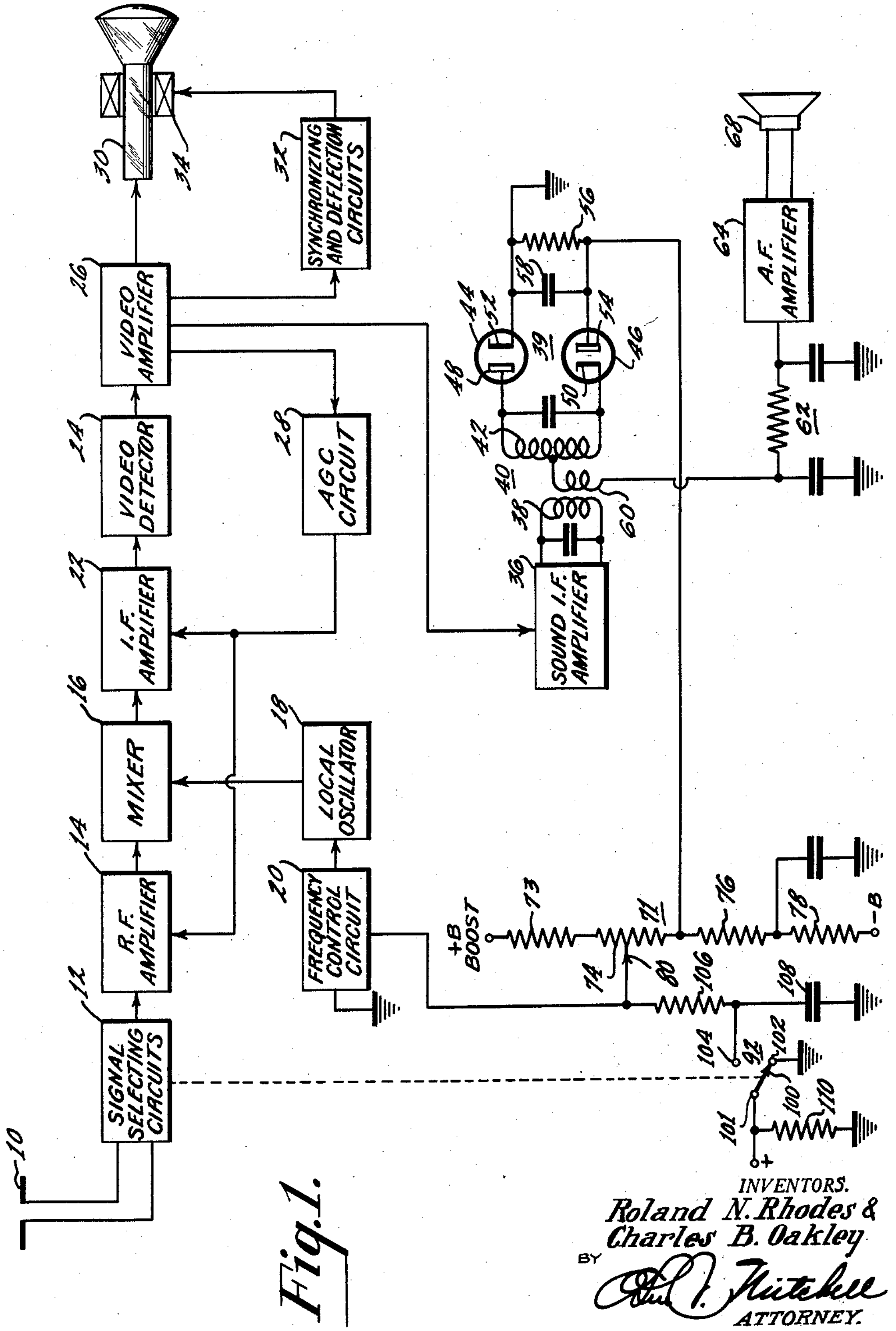
Figure 1 is a schematic circuit diagram of an intercarrier sound television receiver embodying the invention.

Referring now to the drawings and particularly to Figure 1, a composite television signal including an amplitude-modulated video carrier wave and a frequency-modulated sound carrier wave is intercepted by an antenna 10 and applied through the signal selecting circuits 12 of the television receiver to an RF amplifier 14. The signal selecting circuits 12 select the desired channel to which the television receiver is to be tuned. The received signal is applied from the RF amplifier 14 to a mixer 16 where the video and sound carrier waves are heterodyned with the output signal of a local oscillator 18 to produce the desired intermediate frequency. The frequency of the local oscillator 18 is maintained at the proper value by a frequency control circuit 20 which may be a reactance tube circuit of any well known form.

The resultant IF waves produced by the mixer 16 are amplified in an IF amplifier 22 of conventional design and applied to a video detector 24. In the video detector 24 the video IF wave is detected and the video and sound IF waves are heterodyned to produce a 4.5 mc. sound IF and these signals are applied to the video amplifier 26. As is well known, an automatic gain control voltage may be derived from the detected video signal and to this end a portion thereof is applied to an AGC circuit 28, of any conventional form, where an automatic gain control potential is developed which may be applied to the IF and RF amplifiers 22 and 14, as illustrated. The video information is supplied directly to the kinescope 30 and the synchronizing portions thereof are supplied to the synchronizing and deflection circuits 32 of the receiver where, as is well known, the proper voltages and currents are developed to deflect the electron beam or beams of the kinescope 30 and these voltages and current signals are applied to the deflection yoke 34.

The 4.5 mc. sound IF wave appearing in the video amplifier 26 is applied to a sound IF amplifier 36 where it is amplified and developed across the primary winding 38 of a discriminator transformer 40 in a ratio detector circuit 39. The secondary winding 42 of the discriminator transformer 40 is connected at its ends to a pair of rectifier tubes 44 and 46, one end being connected to the anode 48 of the first diode 44 and the opposite end being connected to the cathode 50 of the second diode 46. The cathode 52 of the first diode 44 and the anode 54 of the second diode 46 are connected through a resistor 56 which is shunted by a stabilizing capacitor 58, and the cathode 52 of the first diode 44 is grounded. A tertiary winding 60, which is closely coupled to the primary winding 38, is connected at one end to a center tap on the secondary winding 42 and at the other end through a filter network 62 to an audio frequency amplifier 64. The ratio detector demodulates the 4.5 mc. sound IF carrier wave and applies the resultant audio frequency signal to the audio frequency amplifier 64 where it is amplified and applied to a loudspeaker 68.

Figure 2:
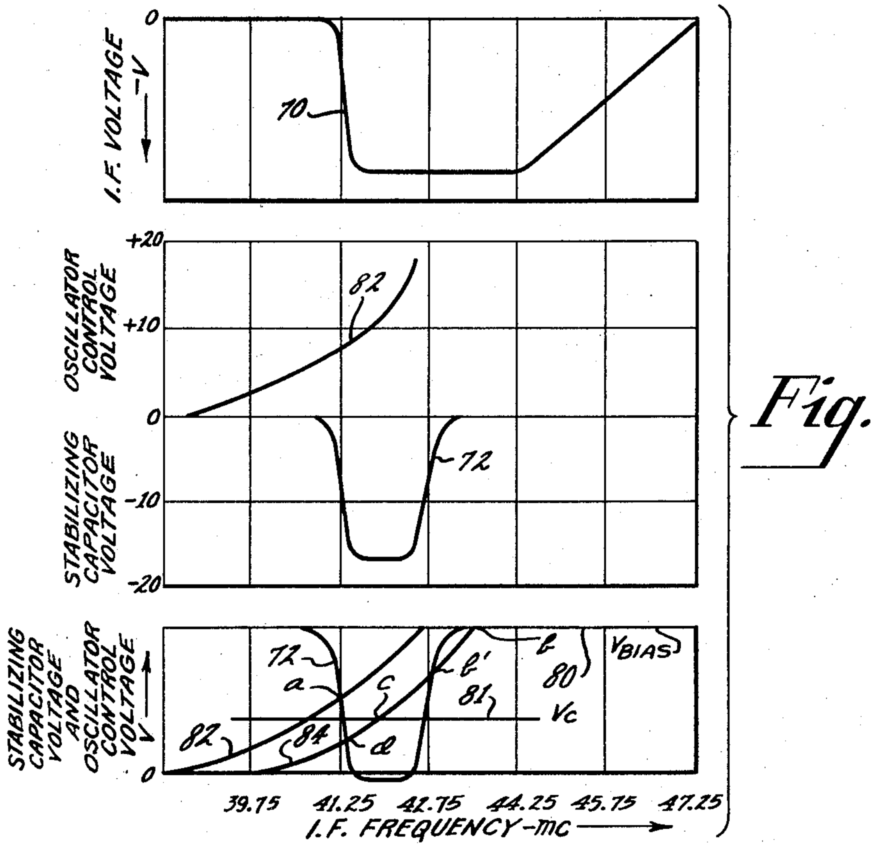
Figures 2 and 3 are graphs showing curves illustrating certain operational features of the circuit of Figure 1.

As thus far described, the apparatus of Figure 1 is in accordance with well known intercarrier sound television receivers that are currently in existence. In order to more fully understand the manner in which the control voltage is derived, there is illustrated in Figure 2 the relationship between the voltage appearing across the stabilizing capacitor 58 of the ratio detector 39 and the position of the video and sound IF carrier waves within the pass-band of the intermediate frequency amplifier 22. The uppermost curve 70 in Figure 2 is a plot of the pass-band of the IF amplifier 22 in which the IF output voltage is plotted against frequency. Ideally, the tuning of the local oscillator should be such that the video IF carrier wave is at 45.75 mc., which would place it halfway up the sloping right hand portion of the curve 70 and the sound IF carrier wave is at 41.25 mc., which would place it well towards zero on the steep left hand portion of the curve 70. The curve 72 in the central portion of Figure 2 is a plot of the voltage across the ratio detector stabilizing capacitor 58 plotted against the beat frequency between the received sound carrier and the local oscillator signal as the local oscillator frequency is varied or, more simply, the IF sound carrier. The voltage developed across the stabilizing capacitor is a function of the amplitude of the 4.5 mc. sound IF wave which, if turn, is a function of the amplitudes of the sound and video IF waves heterodyned in the video detector 24. As a consequence, unless both the video and sound IF carriers are within the pass-band of the IF amplifier 22 no output will be developed across the stabilizing capacitor 58. If the oscillator 18 is properly tuned the voltage across the stabilizing capacitor 58 will fall near the center of the steep left hand slope of the curve 72 of the stabilizing capacitor voltage. If the video carrier is to the right of its ideal center position as shown on curve 70, the sound carrier will be moved up on the steep slope left hand portion and a greater 4.5 mc. output signal is produced, resulting in a greater voltage across the stabilizing capacitor 58. This increase will reach a maximum as indicated by the flat bottom portion of the curve 72 where the 4.5 mc. sound IF signal is large enough to overdrive the sound IF amplifier 36. With further mistuning in this direction, the voltage drops rapidly as the video IF carrier wave begins to fall outside of the passband of the IF amplifier 24. If the video IF wave is mistuned to the left as viewed in curve 70, the sound IF is outside of the IF pass-band, and no 4.5 mc. output is produced.

The voltage across the stabilizing capacitor 58 is thus a sensitive measure of the tuning of the local oscillator 18. This voltage is applied to the frequency control circuit 20 in order to control the frequency of the local oscillator 18 and maintain the frequency near its optimum value. Also plotted on the central portion of Figure 2 is the curve 82 which is an oscillator control characteristic, that is, the frequency of the sound IF carrier, previously mentioned plotted against the voltage applied to the frequency control circuit 20. It will be noted that a positive voltage is required on the frequency circuit while a negative voltage is available across the stabilizing capacitor 58. In order to permit operation at the correct frequency, a bias voltage must be introduced in the frequency control circuit so that the two curves 72 and 82 will intersect at near the proper frequency, since the circuit will stabilize about a voltage which is common to both curves. This is readily accomplished by applying a bias voltage to the frequency control circuit 20 by connecting the stabilizing capacitor 58 to a point on the voltage divider network 71, which network is connected between a source of negative supply voltage, −B, and a source of B boosted positive supply voltage, +B boost, of a conventional intercarrier television receiver. This connection transforms the negative voltage across the stabilizing capacitor 58 to a positive voltage to apply to the frequency control circuit 20. The curve 72 is, in effect, raised by a bias voltage $V_{bias}$ as shown in the lower curve of Figure 2 so that the curves 72 and 82 will intersect. The voltage divider network 71 comprises a first resistor 73, an AFC centering potentiometer 74, and second and third resistors 76 and 78, connected in series between the +B boost supply and the −B supply. A variable tap 80 on the potentiometer 74 may be adjusted to provide a centering control to adjust the bias voltage $V_{bias}$ for the AFC circuit. The voltage across the stabilizing capacitor 58 is applied to the frequency control circuit 20 by connecting the ungrounded side of the stabilizing capacitor 58 to the junction of the AFC centering potentiometer 74 and the second resistor 76. The frequency control circuit 20 is then connected to the variable tap 80 on the AFC centering potentiometer 74.

Certain problems, however, may be encountered when the signal selecting circuits 12 are adjusted to tune the receiver from channel to channel. Referring again to Figure 2, two oscillator control characteristics are illustrated in the lower portion of Figure 2. The two curves 82 and 84 illustrate the type of oscillator control characteristics obtainable and show the variation of the oscillator frequency as the stabilizing capacitor voltage is applied to the frequency control circuit 20 with two different settings of the mechanical tuning of the local oscillator 18. Thus, if a signal is received and the local oscillator 18 is mechanically tuned such that its characteristics will follow a curve such as illustrated by curve 82, the AFC circuit will tune the local oscillator to the proper frequency. The voltage across the stabilizing capacitor 58 will be zero when no signal is being received, and its voltage will start at zero, which is indicated as $V_{bias}$ in Figure 2, and increase negatively as a signal is received. Only one point of equilibrium exists between the oscillator control characteristics curve 82 and the curve 72 of the voltage across the stabilizing capacitor, and this point will be at point *a* where the two curves intersect.

However, if the mechanical tuning of the oscillator is such that the oscillator control characteristic as the AFC voltage is applied is in accordance with curve 84, it will be seen that curves 84 and 72 intersect in three places *b*, *b'* and *d* so that the AFC voltage could lock the oscillator 18 into a mistuned position. The two curves will intersect at the bias voltage $V_{bias}$ at point *b* and since the oscillator will start oscillating at this point no voltage will be built up across the stabilizing capacitor 58. The oscillator would then remain at point *b*. This illustrates the case where the AFC circuit is in a "locked-out" condition and no sound or picture will be reproduced. In order to prevent such a "locked-out" condition, the stabilizing capacitor 58 is charged, in accordance with the invention, during channel switching to a voltage which conditions the oscillator to begin oscillating at a frequency that permits the AFC circuit to properly pull-in for all oscillator curves.

Thus, if a voltage $V_C$, such as illustrated by the horizontal line 81 in Figure 2, is applied across the stabilizing capacitor 58, the oscillator would start operating at point *c* on the oscillator characteristic 84. As the signal begins to build up voltage across the stabilizing capacitor 58 it increases the voltage applied to the frequency control circuit 20 until the point *d* is reached which is the intersection of the oscillator characteristic in stabilizing capacitor voltage curve 72, at which point the operation is stabilized. The frequency difference between the local oscillator tuning and the correct tuning initially was the frequency distance between point *a* and point $c$ as shown in Figure 2, while the action of the AFC circuit corrects the frequency error to only the small frequency distance between point $a$ and point $b$.

Figure 3:
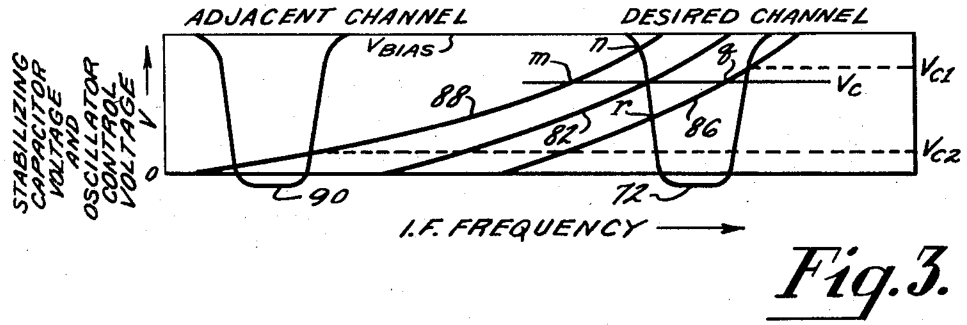

The limits of the oscillator curves possible are illustrated in Figure 3. In Figure 3 curve 82 illustrates a normal, centrally-located oscillator characteristic, while curve 86 illustrates one extreme of mistuning of the local oscillator, and curve 88 illustrates the opposite extreme, that could cause "lock-out" on an adjacent channel. The adjacent channel is illustrated by curve 90. However, if the charging voltage applied to the stabilizing capacitor during channel switching is between the values indicated by $V_{C1}$ and $V_{C2}$, as illustrated by the dotted horizontal lines on Figure 3, the oscillator must pull-in to the proper tuning frequency, since the oscillator frequency will start at a point at which it cannot "lock-out" at the wrong frequency.

Thus, if an initial small voltage $V_C$ indicated by the horizontal line 81 in Figure 3 is applied to the stabilizing capacitor 58, an oscillator curve such as curve 88 would begin oscillator operation at point $m$ on curve 88, and as signal is received the voltage across the stabilizing capacitor 58 builds up only to a small value which is less than $V_C$. The voltage $V_C$ will eventually discharge to cause operation of the oscillator at point $n$ where the curves 88 and 72 intersect. If the oscillator characteristic were illustrated by curve 86, the charging voltage $V_C$ causes the oscillator to begin operation at point $q$ and the voltage across the stabilizing capacitor 58 increases above the value of $V_C$ as signal is received to cause operation at point $r$.

To supply this interchannel charging voltage, referring again to Figure 1, a switch 92 is connected to supply a small positive voltage to the stabilizing capacitor 58 during channel switching. The switch 92 is mechanically ganged to the switches in the signal selecting circuits 12 such that as the signal selecting circuits 12 are moved from channel to channel the movable contact 100 of the switch 92 is automatically moved from the ground contact 102 to the charging contact 104 and back to the ground contact 102. This action will apply a small positive voltage to the voltage divider network 71 and thus a small negative voltage through the resistor 106 and across the capacitor 108 to the stabilizing capacitor 58 of the ratio detector 39 during channel switching. The positive voltage may be derived from any convenient source within the television receiver and developed across a small resistor 110 connected to the common terminal 101 of the switch 92.

It will also be noted, that the provision of the B boost supply voltage in the voltage divider network 71 provides an additional advantage. If the AFC circuit were allowed to operate to control the oscillator frequency before the remainder of the circuits in the television receiver had warmed up sufficiently for normal operation, the oscillator frequency could be locked out to an undesired signal. However, the B boost supply voltage does not come on until all circuits are in operating condition and thus, if the AFC circuit locks in at all, it must be locked in at the correct value.

Figure 4:
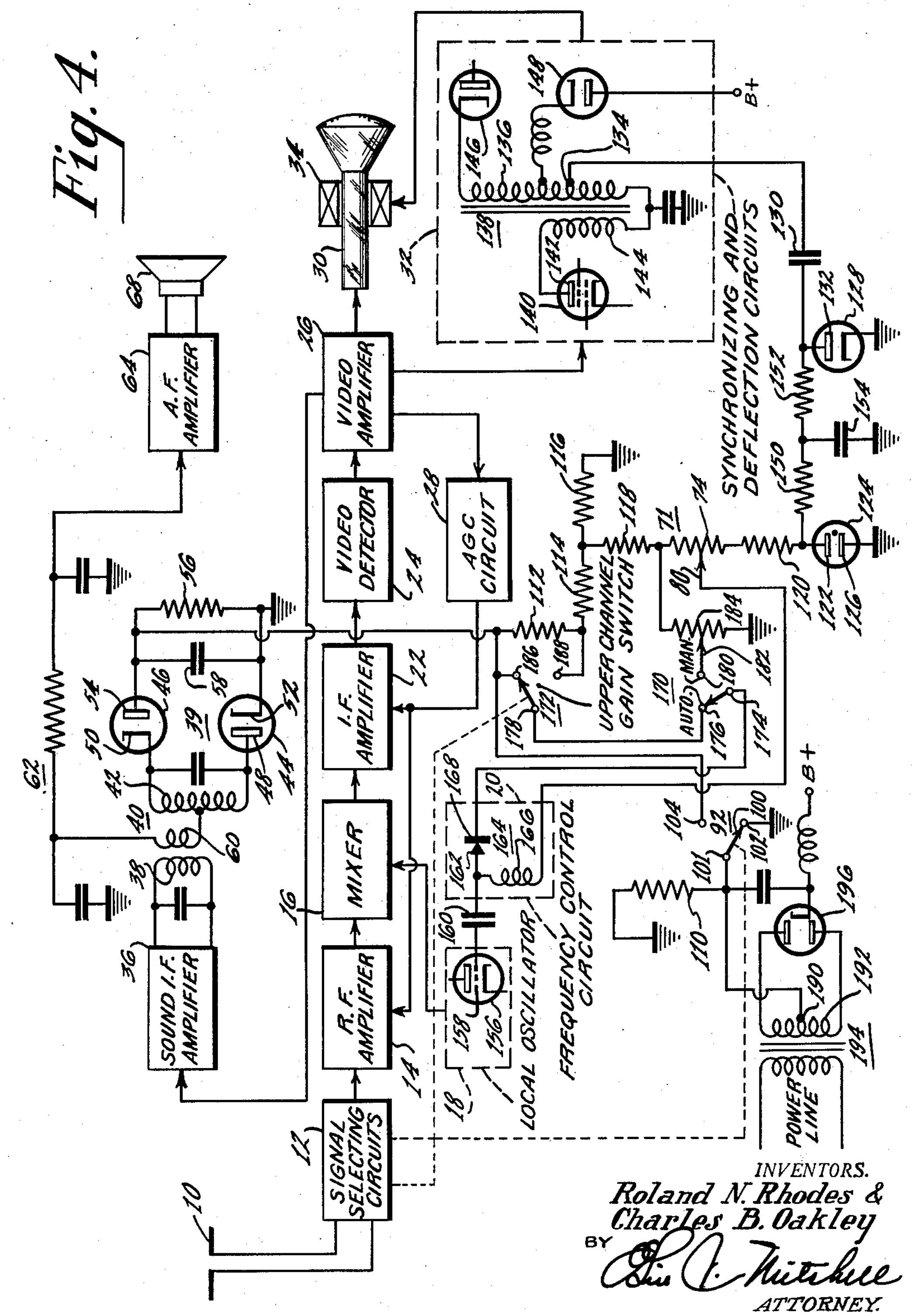
Figure 4 is a schematic circuit diagram of an intercarrier sound television receiver illustrating another embodiment of the invention; and, Figure 5 is a graph showing curves illustrating certain additional operating characteristics of the circuit of Figure 4.

In accordance with another form of the invention illustrated in Figure 4, circuit simplification and additional functions may be achieved. It will be noted that those parts of the television receiver of Figure 4 corresponding to those of Figure 1 bear the same reference numerals and their description need not be repeated. However, the voltage across the stabilizing capacitor 58 of the ratio detector 39 is herein illustrated as being applied to the voltage divider network 71 through a pair of resistors 112 and 114. The voltage divider network includes first and second resistors 116 and 118, an AFC centering potentiometer 74, and a third resistor 120 connected in series between ground or a point of reference potential for the receiver and one terminal 122 of a neon tube 124. The other terminal 126 of the neon tube is connected directly to ground. The ungrounded terminal 122 of the neon tube 124 is supplied with a D.-C. voltage, negative with respect to ground, from a half wave rectifier tube 128 through a filter network comprising series connected resistors 150 and 152 and a shunt connected capacitor 154. A positive pulse of voltage is supplied through a capacitor 130 to the anode 132 of the rectifier tube 128 from a tap 134 on the secondary winding 136 of a horizontal output transformer 138 included in the synchronizing and deflection circuits 32 of the television receiver. A horizontal output tube 140 has its anode 142 connected to the primary winding 144 of the horizontal output transformer 138. The circuitry associated with the horizontal output tube 140 supplies the proper currents and voltages in the secondary winding 136 to perform a number of functions. For instance, a high voltage rectifier tube 146 is connected to the secondary winding 134 to supply the accelerating potential for the kinescope 30. A damper tube 148 may also be associated therewith, and the deflection yoke 34 is connected to the secondary winding 134, although this connection is not shown in the interest of simplicity. It is not believed necessary to further describe the circuitry associated with the horizontal output transformer 138 other than to state that a positive pulse of voltage may be derived from the tap 134 on the secondary winding 136. The neon tube 124 provides a degree of regulation for the D.-C. voltage from the rectifier tube 128.

The local oscillator 18 is illustrated as including a triode electron tube 156 as an oscillator tube which has its control grid 158 connected through a capacitor 160 to the anode 162 of a semiconductor junction diode 164. It is not believed necessary to illustrate further the oscillator circuit, since many types of oscillators suitable for television receivers are well known.

As is know, the capacitance across a semiconductor junction diode varies with the amount of reverse bias applied thereacross. Thus, variation of the voltage across the diode 164 will vary the capacitance in the grid circuit of the oscillator tube 156 and vary the frequency of the oscillations.

In order to control the reverse bias across the diode 164, a negative potential is applied to the anode 162 through a radio frequency choke coil 166 and the variable tap 80 on the AFC centering potentiometer 74 in the voltage divider 71. The cathode 168 of the diode 164 is connected through a manual-automatic switch 170 and an upper channel gain switch 172 to the stabilizing capacitor 58 on the ratio detector 39. Specifically, the cathode 168 of the diode 164 is connected to the common terminal 174 of the single-pole-double-throw, automatic-manual switch 170. The first terminal 176 of the automatic-manual switch 170 is connected to the common terminal 178 of the upper channel gain switch 172 and the second terminal 180 is connected to a variable tap 182 on a manual tuning potentiometer 184. Throwing the automatic-manual switch 170 to connect the common terminal 174 to the second terminal 180 disables the AFC circuit and permits manual fine tuning by variation of the tap 182 on the manual tuning potentiometer 184.

Referring now to the upper channel gain switch 172, the first terminal 186 is connected directly to the stabilizing capacitor 58 of the ratio detector 39 and the second terminal 188 is connected to the junction of resistors 112 and 114. The function of the upper channel gain switch 172 will be more fully explained hereinafter and for the purposes of the present discussion it will be assumed that it is conditioned to connect the common terminal 178 with the first terminal 186. Thus, with the manual-automatic switch 170 in the automatic position connecting the first terminal 176 with the common terminal 174, it will be seen that the voltage appearing across the ratio detector stabilizing capacitor 58 is connected directly to the cathode 168 of the diode 164.

The manner of operation of the AFC circuit proper is similar to that previously described with reference to Figure 1. An increase in voltage across the stabilizing capacitor 58 will make the cathode 168 more negative with respect to the anode 162 and result in a decrease in the reverse bias across the diode 164, changing the capacitance thereacross and altering the frequency of the local oscillator 18. It will be noted that the diode 164 in the frequency control circuit 20 is not grounded at one side as was the case with the frequency control circuit of Figure 1.

The charging switch 92 is connected in a manner similar to that of Figure 1. The charging terminal 104 is connected directly to the stabilizing capacitor 58 and the ground terminal 102 is connected directly to ground as in Figure 1. The common terminal 101 is connected to a center tap 190 of the secondary winding 192 of a power transformer 194. A rectifier tube 196 is connected in a conventional manner to the secondary winding 192 to provide operating +B voltage for the television receiver. A small resistor 110 is connected between a center tap 190 of the transformer secondary winding 194 and ground for the receiver. When the contact of the charging switch 92 is moved from the ground terminal 102 to the charging terminal 104 during channel switching a small D.-C. voltage of negative polarity with respect to ground, appears across a resistor 110 which is applied to the stabilizing capacitor 58 in the manner similar to that previously described with reference to Figure 1.

The embodiment of the invention herein described is similar to that shown in Figure 1 with the exception that only one voltage supply is used for the voltage divider 71. It will be noted that the voltage supplied to the voltage divider network 71 has the same advantage as the B boost supply described in Figure 1, that is, the pulses available at the tap 134 on the horizontal output transformer 138 do not appear until the receiver has warmed up sufficiently for normal operation. The AFC circuit will thus lock-in the oscillator at the correct frequency when the receiver is initially turned on.

The manner of operation of the circuit of Figure 4 is similar to that described with reference to Figure 1, and the discussion with respect to the operational features of the circuit of Figure 1 is equally applicable here. Briefly, the voltage across the stabilizing capacitor 58 is applied through the voltage divider network 71 to the diode 164 in the frequency control circuit 20 to control the frequency of the oscillator 18. The charging switch 92 is ganged with the signal selecting circuits 12 to momentarily apply a charging voltage to the stabilizing capacitor 58 in the ratio detector circuit 39 as the signal selecting circuits 12 are switched from channel to channel This charging voltage provides that the AFC circuit will lock-in at the correct frequency in the manner described with reference to Figure 1.

Figure 5:
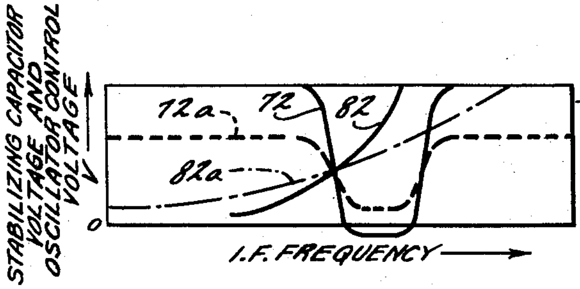

At the higher television frequencies, or upper channel frequencies, the sensitivity of the oscillator is higher, that is, a given increment of change in the capacitance of the diode 164 causes a fixed percentage change in the oscillator frequency. At the higher frequency channels this will result in a greater absolute frequency change and provide more sensitive oscillator control. This is illustrated in Figure 5 where the curve 72 is a plot of the stabilizing capacitor voltage against frequency and the curve 82 is a plot of the change in oscillator frequency with a change in bias across the diode 164. Since the upper channel frequencies are greater than twice those of the lower channels, a given change in voltage across the diode 164 will result in greater than twice the change in frequency on the upper channels as it will on the lower channels. This increased sensitivity is illustrated by the curve 82*a* in Figure 5. Thus, if the voltage across the stabilizing capacitor were to be applied directly to the AFC diode 164 on the upper channels it will be apparent that the "lock-out" problems will become more severe, since the curve 82*a* which intersects the left hand portion of the curve 72 in the proper position also intersects the right hand portion of the curve 72 and the $V_{bias}$ line.

In order to reduce the overall sensitivity of the AFC circuit on the higher channels, only a portion of the voltage appearing across the stabilizing capacitor 58 is applied to the AFC diode. This results in a characteristic curve such as shown by the curve 72*a* of Figure 5. If the voltage applied to the AFC diode is in accordance with the curve 72*a* it will be seen that the "lock-out" problems will be drastically reduced. This reduction is accomplished by the upper channel gain switch 172 which is ganged mechanically to the signal selecting circuits 12, and is so arranged that on the lower frequency channels the common terminal 178 is connected to the first terminal 186 and on the upper frequency channels the common terminal 178 is connected to the second terminal 188. Thus, on the upper frequency channels only a portion of the voltage appearing across the stabilizing capacitor 58 is applied to the diode 164. The ratio, of course, is determined by the resistance of the resistor 112 compared to the entire value of the resistors 112, 114 and 116, that are connected between the stabilizing capacitor 58 and ground.

An automatic frequency control circuit in an intercarrier television receiver constructed in accordance with the invention not only provides increased reliability in the automatic tuning of the local oscillator of the receiver, but also prevents the AFC circuit from locking the oscillator to an undesired frequency during channel switching.

What is claimed is:

1. In a signal receiver having a signal selection circuit for selectively tuning said receiver to one of a plurality of signal channels, each channel having two carrier waves separated by a fixed frequency, the combination of first signal mixing means including a local oscillator for deriving a separate intermediate frequency carrier wave corresponding to each of said carrier waves and separated by said fixed frequency, frequency controlling means connected to said local oscillator, second signal mixing means for heterodyning said separate intermediate frequency waves to produce a further intermediate frequency wave having a center frequency equal to said fixed frequency, means for deriving a unidirectional control signal varying in amplitude corresponding to the variations in amplitude of said further intermediate frequency wave, circuit means for applying said control signal to said frequency controlling means to vary the frequency of said local oscillator in accordance therewith, and means for applying a D.-C. potential to said circuit means during the interval when said receiver is switched from one channel to a second channel to provide an initial oscillator signal at a predetermined frequency with respect to the frequency of the selected signal as signals in said second channel are received.

2. In a signal receiver having a signal selection circuit for selectively tuning said receiver to one of a plurality of channel frequencies within a frequency band, each of said channels having two carrier waves, one of which is frequency-modulated, separated by a fixed frequency, the combination of first signal mixing means including a local oscillator for deriving a separate intermediate frequency carrier wave corresponding to each of said carrier waves within one of said channels, said intermediate frequency waves being separated by said fixed frequency, frequency controlling means connected to said local oscillator for varying the frequency of oscillations thereof, second signal mixing means for heterodyning said separate intermediate frequency waves to produce a further intermediate frequency carrier wave frequency-modulated in accordance with the frequency modulation of one of said carrier waves and having a center frequency equal to said fixed frequency, a ratio detector circuit having a stabilizing capacitor, means for applying said further intermediate frequency wave to said ratio detector for demodulating said wave and for deriving across said stabilizing capacitor a unidirectional potential varying in proportion to the variations in amplitude of said wave, means for applying at least a portion of said unidirectional potential across said stabilizing capacitor to said frequency controlling means to vary the frequency of said local oscillator as a function of the amplitude of said further intermediate frequency wave, and means for applying a D.C. potential to said stabilizing capacitor during the interval that said signal selection circuits are switched from one channel to another to charge said capacitor to a voltage substantially equal to said D.-C. potential.

3. In an intercarrier sound television receiver having a signal selection circuit for selectively tuning said receiver to one of a plurality of television channels, a local oscillator, first signal mixing means for heterodyning a received television signal with a wave produced by said local oscillator for deriving corresponding intermediate frequency carrier waves, means for deriving a further intermediate frequency wave frequency-modulated in accordance with the frequency modulation of one of said carrier waves, a ratio detector circuit having a load resistance and a stabilizing capacitor connected in shunt therewith, means for applying said further intermediate frequency wave to said ratio detector for demodulating said wave and for deriving a control voltage across said stabilizing capacitor which varies unidirectionally in proportion to the variation in amplitude of said wave, the combination of frequency controlling means connected to said local oscillator for varying the frequency of oscillations thereof, means for applying at least a portion of the control voltage to said frequency controlling means to vary the frequency of said local oscillator as a function of the amplitude of said third intermediate frequency wave, means providing a source of D.-C. potential, and means for applying said source of D.-C. potential to said stabilizing capacitor to charge said capacitor to a voltage substantially equal to said D.-C. potential during the interval that said signal selection circuits are switched from one channel to another.

4. In a signal receiver having a signal selection circuit for selectively tuning said receiver to one of a plurality of channels within a frequency band, each of said channels having two carrier waves, one of which is frequency-modulated, separated by a fixed frequency, the combination of first signal mixing means including a local oscillator for deriving a separate intermediate frequency carrier wave corresponding to each of said carrier waves within one of said channels, said intermediate frequency waves being separated by said fixed frequency, frequency controlling means connected to said local oscillator for varying the frequency of the oscillations thereof, means for heterodyning said separate intermediate frequency waves to produce a further intermediate frequency carrier wave frequency-modulated in accordance with the frequency modulation of one of said carrier waves and having a center frequency equal to said fixed frequency, a ratio detector having a stabilizing capacitor, means for applying said further intermediate frequency wave to said ratio detector for deriving across said stabilizing capacitor a control signal varying in accordance with the variations in amplitude of said wave, circuit means for applying at least a portion of said control signal to said frequency controlling means to vary the frequency of said local oscillator, and means for applying a D.-C. potential to said stabilizing capacitor during the interval that said signal selection circuits are switched from one channel to another.

5. In a signal receiver, the combination as defined in claim 4 wherein said circuit means comprises a voltage divider network, means providing a second source of D.-C. potential for said receiver that is operative only after said receiver is in operating condition after having been initially turned on, and means for connecting said voltage divider network to said second source of D.-C. potential, whereby said control signal is inoperative to control the frequency of said local oscillator until said receiver is in operating condition.

6. In an intercarrier sound television receiver having a signal selection circuit for selectively tuning said receiver to one of a plurality of high frequency channels and a plurality of low frequency channels within a frequency band, each of said channels having two carrier waves separated by a fixed frequency, one of said waves being frequency modulated, the combination of a local oscillator, first signal mixing means for heterodyning said carrier waves with a wave produced by said local oscillator for deriving corresponding intermediate frequency carrier waves separated by said fixed frequency, frequency controlling means connected to said local oscillator for varying the frequency of oscillations thereof, second signal mixing means for heterodyning said separate intermediate frequency waves to produce a further intermediate frequency carrier wave being frequency-modulated in accordance with the frequency modulation of one of said carrier waves and having a center frequency equal to said fixed frequency, a ratio detector circuit having a stabilizing capacitor, means for applying said further intermediate frequency wave to said ratio detector for demodulating said wave and for deriving a control voltage across said stabilizing capacitor which varies unidirectionally in proportion to the variations in amplitude of said wave, means for applying the entire control voltage to said frequency controlling means when the signal selection circuit is positioned to receive a low frequency channel to vary the frequency of said local oscillator as a function of the amplitude of said further intermediate frequency wave, and means for applying a portion of the control voltage to said frequency controlling means when the signal selection circuit is positioned to receive a low frequency channel to vary the frequency of said local oscillator as a function of the amplitude of said further intermediate frequency wave, means providing a source of D.-C. potential, and means for applying said source of D.-C. potential to said stabilizing capacitor to charge said capacitor to a voltage substantially equal to said D.-C. potential during the interval that said signal selection circuits are switched from one channel to another.

7. In an intercarrier sound television receiver having a signal selection circuit for tuning said receiver to any one of a plurality of television channels, a local heterodyne oscillator, and a sound channel including a frequency modulation detector having a stabilizing capacitor, the combination of frequency controlling means connected to said oscillator, circuit means connecting said stabilizing capacitor to said frequency controlling means to vary the frequency of said oscillator in accordance with the potential developed across said stabilizing capacitor, and means for applying a D.-C. potential to said circuit means during the interval said receiver is switched from one channel to a second channel to provide an initial oscillator signal at a predetermined frequency with respect to the frequency of the selected signal as signals in said second channel are received.

References Cited in the file of this patent

UNITED STATES PATENTS

| | | |
|---|---|---|
| 2,240,428 | Travis | Apr. 29, 1941 |
| 2,496,063 | Mural | Jan. 31, 1950 |
| 2,664,464 | Cotsworth | Dec. 29, 1953 |
| 2,666,847 | Alter | Jan. 19, 1954 |
| 2,702,343 | Trevor | Feb. 15, 1955 |